Dec. 8, 1970     A. E. SMITH     3,545,287
SPIN AXIS DETECTOR FOR BALL-TYPE GYRO
Filed April 30, 1968
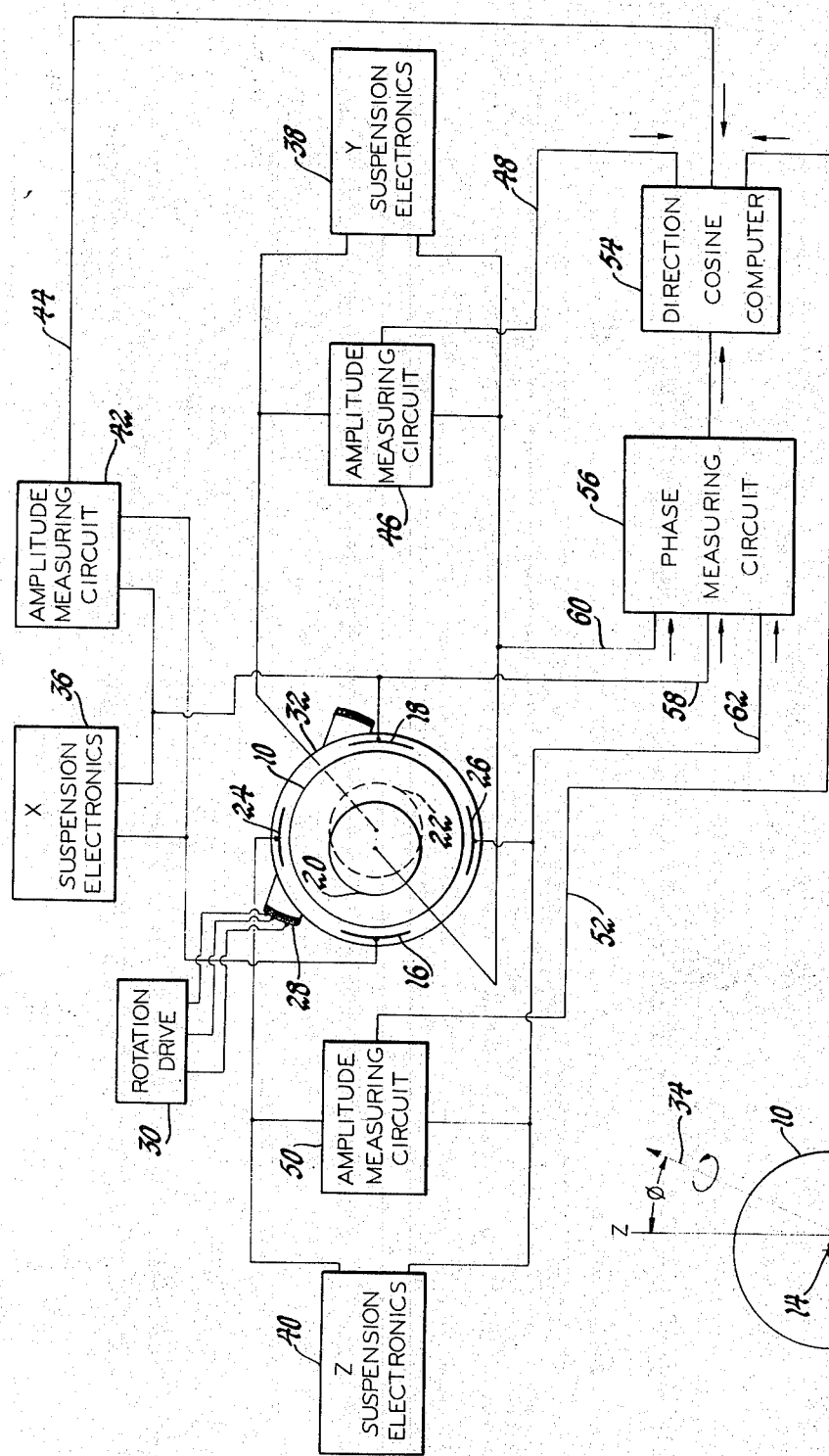
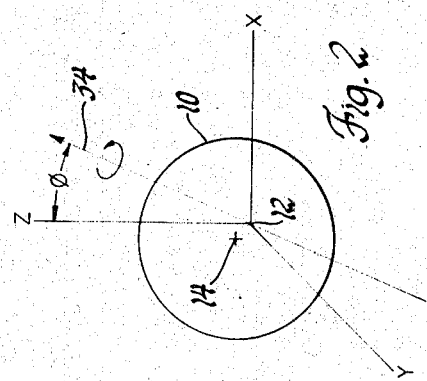
INVENTOR.
Arthur E. Smith
BY
Thomas N. Young
ATTORNEY з,545,287
SPIN AXIS DETECTOR FOR BALL-TYPE GYRO
Arthur E. Smith, Topsfield, Mass., assignor to General Motors Corporation, Detroit, Mich., a corporation of Delaware
Filed Apr. 30, 1968, Ser. No. 725,330
Int. Cl. G01c 19/08
U.S. Cl. 74—5.6                                       4 Claims

ABSTRACT OF THE DISCLOSURE

An inertial attitude reference comprising a spherical rotor in which the centers of mass and geometry are non-coincidental. Rotation about the mass center causes periodic displacement relative to diametrically opposite electrode pairs adjacent the rotor. A change in attitude of the rotor spin axis relative to the electrodes is determined by the change in amplitude and phase of signals capacitively induced on the electrode pairs.

---

It is well understood that the angular momentum vector of a spinning body tends to remain fixed in space in the absence of torques applied to the body. The gyroscope used as an inertial reference is a manifestation of this principle.

One implementation of the gyroscopic inertial reference comprises a spherical rotor which spins about an axis within a surrounding group of capacitive electrodes which produce electrostatic supporting forces for the rotor. Since the rotor is free from physical contact with the electrodes, and the rotor spin axis tends to remain fixed in space, any change in the orientation of a body carrying the electrodes can be determined by reference to the spin axis of the rotor. To determine a relative displacement between the rotor spin axis and the electrodes, the rotor may be enscribed with a pattern of lines. Optical means mounted adjacent the rotor sense the lines and produce signals the relative phases of which determine the orientation of the rotor spin axis relative to surrounding structure. Such a system is shown in the U.S. patent to Nordsieck, 3,313,161.

In accordance with the present invention, the relative orientation of a spherical rotor's spin axis may be determined without the need for precise markings on the rotor itself. In general, this is accomplished by forming the rotor such that the centers of mass and geometry are non-coincidental. At the proper speed, the rotor spin axis passes through the center of mass. A periodic displacement thus occurs between the surface of the rotor and the surface of plate electrodes adjacent the rotor. The plate electrodes are excited by an AC source whereby a periodic voltage is capacitively induced on the electrodes at the frequency of rotation. Any change in the angle between the spin axis and an axis through the electrodes produces a change in the amplitude of the periodic voltage. Accordingly, amplitude may be monitored as an indicator of orientation. Further, the direction of change in relative rotor orientation may be determined from a comparison of the phase between several pairs of electrodes.

For a full understanding of the invention, a specific embodiment of the invention is set forth in the following specification together with the accompanying drawings of which:

FIG. 1 is a diagram of the structural nature of the embodiment; and

FIG. 2 is a vector diagram used to explain the operation of the embodiment.

In the figures, reference numeral 10 designates a hollow spherical rotor of conductive and dimensionally stable material such as beryllium. As best shown in FIG. 2, the rotor 10 is constructed so that the center of mass 12 is displaced from the center of geometry 14. In other words, while rotor 10 is externally spherical it is intentionally constructed so as to exhibit a mass unbalance. Rotor 10 is shown in FIG. 1 to be disposed substantially centrally of three pairs of plate type electrodes which produce electrostatic fields to support rotor 10 free from physical contact with its surroundings. More specifically, a first pair of electrodes 16, 18 is disposed along an X measurement axis such that electrodes 16 and 18 are diametrically opposite one another and spaced from the spherical rotor 10. A second pair of electrodes 20, 22 is similarly disposed along a Y measurement axis. A third pair of electrodes 24, 26 is similarly disposed along a Z measurement axis. The X, Y and Z measurement axes are mutually perpendicular as indicated in FIG. 2. A multiphase stator winding 28 may be disposed adjacent rotor 10 and connected to a source 30 for imparting a rotation to the rotor 10. The combination including the rotor 10 and the electrodes may be enclosed by a surrounding structure 32 which is hermetically sealed. Thus the rotor 10 may be rotated in a vacuum such that the rotational drive source 30 is only excited for the purpose of bringing the rotor 10 up to speed. Thereafter source 30 is disconnected and the rotor 10 is free of any disturbance torques and may be used as an inertial reference.

When rotated above the critical speed, rotor 10 tends to rotate about a spin axis which passes through the center of mass 12. As shown in FIG. 2, the spin axis 34 is angularly displaced from each of the three measurement axes X, Y and Z and, further, does not pass through the center of geometry 14. This condition may be preestablished by means of an erection technique employed prior to use of the rotor 10 as an inertial reference.

The electrostatic supporting forces which levitate rotor 10 are generated by applying an AC voltage across each pair of capacitive electrodes. Electrodes 16 and 18 are connected to an electronics unit 36 containing an AC voltage source. Similarly, electrodes 20 and 22 are connected to electronics unit 38 and electrodes 24 and 26 are connected to unit 40. Preferably, the voltages produced by units 36, 38 and 40 are spaced by 120 electrical degrees so as to represent in combination a three-phase electrical source. Accordingly, the net charge on rotor 10 is zero and no ground is required.

Connected across each electronics is an amplitude monitor which provides an output corresponding to the amplitudes of an alternating voltage capacitively induced on the associated electrode pairs due to rotation of rotor 10. For the X measurement axis, an amplitude measuring circuit 42 is connected across the electrodes 16 and 18. Circuit 42 may include a frequency selective filter so as to respond only to alternating voltage components at a frequency corresponding to the rotational frequency of sphere 10. In addition, circuit 42 includes an amplitude monitor for providing an output on line 44 which represents the amplitude of the alternating voltage component sensed. An amplitude measuring circuit 46 is connected across electrodes 20 and 22 associated with the Y axis. Circuit 46 is provided with an output line 48. Finally, amplitude measuring circuit 50 is connected across the Z axis electrodes 24 and 26 and provides an output on line 52.

Output lines 44, 48 and 52 are connected to the inputs of a direction cosine computer 54 which also receives an input from a phase measuring circuit 56. The phase measuring circuit is connected to one electrode in each of the three electrode pairs; more specifically, electrode 18 along the X axis is connected to input 58 of phase measuring circuit 56, electrode 20 of the Y axis is connected to input 60 and electrode 26 is connected to input 62. The voltages appearing on input lines 58, 60 and 62 occur at a frequency corresponding to the frequency of rotation of rotor 10 but are subject to phase variation in accordance with the orientation of the spin axis 34.

In operation rotor 10 is supported free from physical contact with any of the electrodes and brought up to speed by source 30. An inertial reference axis corresponding to spin axis 34 is thus established. Preferably, this spin axis does not correspond with any of the X, Y or Z measurement axes. Accordingly, the system is erected such that an initial angle $\phi$ of displacement between the Z axis ond the spin axis 34 exists. Under the condition shown in FIG. 2, the distance between the surface of rotor 10 and the inner surface of the electrodes varies at the angular rate of the rotor 10. This relative displacement periodically varies the capacitive gap between the electrodes an dthe surface of rotor 10. As is known, varying the gap between capacitor plates while holding the charge constant varies the voltage between the plates. Thus, the relative wobble of rotor 10 induces a time varying voltage on each of the electrodes associated with the X, Y and Z measurement axes. The amplitude of the induced voltage is proportional to the sine of the angle between the spin axis 34 and the measurement axis. Accordingly, knowing conditions of initial alignment, it is possible to determine the orientation of the spin axis 34 relative to the support structure 32 by monitoring the amplitude of the capacitively induced voltages. This task is accomplished by circuits 42, 46 and 50. A coordinated representation of these angles may be generated by the computer 54.

To determine the sense or direction of the rotation of spin axis 34, the phase angles between the induced voltages are compared at 56. This direction information may also be presented at computer 54 for various purposes including navigation or automatic control of a vehicle such as an aircraft. Various implementations of the circuits shown in FIG. 1 will be obvious to those skilled in the art and, accordingly, no single electrical implementation is illustrated herein. By way of example, a limited or digital nature may be employed to coordinate the capacity special purpose computer of either an analog amplitude and phase information presented by the circiut of FIG. 1.

Accordingly, it has been shown herein that it is possible to establish an inertial reference axis using a mass unbalanced spherical rotor and to determine relative changes in the orientation of the inertial reference with respect to surrounding structure without placing precisely located markings of any kind on the surface of the rotor. The foregoing specification relating to a specific embodiment of the invention is intended to be illustrative in nature and is not to be construed in a limiting sense. For a definition of the invention reference should be taken to the appended claims following.

What is claimed is:

1. An inertial reference unit comprising: a spherical body of conductive material having a center of mass which is displaced from the geometric center thereof, a pair of electrodes disposed diametrically opposite the body along a measurement axis, a source for exciting the electrodes with an alternating current to freely suspend the body between the electrodes, means for rotating the body about a spin axis extending through the center of mass but displaced from the geometric center, and means connected to said electrodes for measuring the amplitude of a time varying voltage capacitively induced across the electrodes as a result of rotation of the body.

2. An inertial reference unit comprising: a spherical body of conductive material having a center of mass which is displaced from the geometric center thereof, first, second and third pairs of electrodes disposed diametrically opposite the body along first, second and third mutually orthogonal measurement axes, means for exciting each of the electrode pairs with an alternating voltage to freely suspend the body between the electrodes, means to rotate the body about a spin axis extending through the center of mass but displaced from the geometric center, means for monitoring the amplitude of time varying voltages capacitively induced across the electrode pairs, and phase measurement means connected to at least one electrode each of the pairs for measuring the relative phase between the time varying voltages capacitively induced on the electrode pairs as a result of rotation of said body about the spin axis.

3. An inertial reference unit as defined in claim 2 including: computing means connected to the phase measurement and the amplitude sensing means for determining the direction and extent of change in the orientation of the spin axis relative to the measurement axes.

4. Apparatus as defined in claim 3 wherein the alternating voltages on the electrode pairs are spaced in phase by 120 electrical degrees.

References Cited

UNITED STATES PATENTS

| 2,925,590 | 2/1960 | Boltinghouse | 74—5.6XR |
| 2,976,736 | 3/1961 | Cook | 74—5.6 |
| 3,286,533 | 11/1966 | Towner | 74—5.6 |
| 3,295,379 | 1/1967 | Jensen et al. | 74—5.6 |
| 3,299,714 | 1/1967 | Thompson et al. | 74—5XR |
| 3,320,817 | 5/1967 | Iddings | 74—5.6 |

MANUEL A. ANTONAKAS, Primary Examiner

U.S. Cl. X.R.

74—5.7

PO-1050
(5/69)

UNITED STATES PATENT OFFICE
CERTIFICATE OF CORRECTION

Patent No. 3,545,287          Dated December 8, 1970

Inventor(s)          Arthur E. Smith

It is certified that error appears in the above-identified patent and that said Letters Patent are hereby corrected as shown below:

In the Specification, Column 3, line 42, the line reading "capacity special purpose computer of either an analog" should appears as line 41 after the line ending in -- a limited --.

Signed and sealed this 11th day of May 1971.

(SEAL)
Attest:

EDWARD M. FLETCHER, JR.          WILLIAM E. SCHUYLER, JR.
Attesting Officer                Commissioner of Patents